(12) United States Patent
Raji et al.

(10) Patent No.: US 8,460,760 B2
(45) Date of Patent: Jun. 11, 2013

(54) COATING A PERFORATED SURFACE

(75) Inventors: Edris Raji, Tolland, CT (US); Michael J. Schober, Vernon, CT (US); Alan C. Barron, Jupiter, FL (US); Robin Mihekun Miller, West Hartford, CT (US)

(73) Assignee: United Technologies Corporation, Hartford, CT (US)

(*) Notice: Subject to any disclaimer, the term of this patent is extended or adjusted under 35 U.S.C. 154(b) by 49 days.

(21) Appl. No.: 12/956,080

(22) Filed: Nov. 30, 2010

(65) Prior Publication Data

US 2012/0131922 A1 May 31, 2012

(51) Int. Cl.
*B05D 7/22* (2006.01)
*B05D 1/02* (2006.01)
*B05D 5/00* (2006.01)

(52) U.S. Cl.
CPC *B05D 1/02* (2013.01); *B05D 5/005* (2013.01); *B05D 7/22* (2013.01)
USPC ......... 427/427.3; 427/140; 427/236; 427/239

(58) Field of Classification Search
CPC .............. B05D 1/02; B05D 5/005; B05D 7/22
USPC ............. 427/140, 230–236, 238, 239, 421.1, 427/424, 425, 427.3
See application file for complete search history.

(56) References Cited

U.S. PATENT DOCUMENTS

| | | | |
|---|---|---|---|
| 764,454 | A | 7/1904 | Giles |
| 1,229,284 | A | 6/1917 | Kempel |
| 2,032,923 | A | 3/1936 | Eldridge |
| 2,241,104 | A | 5/1941 | Van Der Grinten |
| 2,953,483 | A | 9/1960 | Torok |
| 2,990,533 | A | 6/1961 | Hughes et al. |
| 3,042,549 | A | 7/1962 | Arnold |
| 3,042,591 | A | 7/1962 | Cado |
| 3,247,004 | A | 4/1966 | Dosser |
| 3,294,576 | A | 12/1966 | Geraghty |
| 3,450,558 | A | 6/1969 | Whaley et al. |
| 3,535,157 | A | 10/1970 | Steinhoff et al. |
| 3,635,013 | A | 1/1972 | Bertsch et al. |
| 3,697,473 | A | 10/1972 | Polmanteer et al. |
| 3,830,721 | A | 8/1974 | Gruen et al. |
| 3,892,883 | A | 7/1975 | Leclercq |

(Continued)

FOREIGN PATENT DOCUMENTS

| | | |
|---|---|---|
| DE | 687244 | 1/1940 |
| EP | 0251810 | 1/1988 |

(Continued)

OTHER PUBLICATIONS

European Search Report dated Aug. 22, 2012 for European Application No. 11191338.0.

*Primary Examiner* — William Phillip Fletcher, III
(74) *Attorney, Agent, or Firm* — Carlson, Gaskey & Olds P.C.

(57) ABSTRACT

An example method of coating a surface includes rotating a sprayer about an axis and directing spray away from the axis using the sprayer. The method coats a surface with the spray. The method moves a fluid through apertures established in the surface to limit movement of spray into apertures. The apertures are configured to direct the fluid toward the axis.

17 Claims, 4 Drawing Sheets

U.S. PATENT DOCUMENTS

Figure 1:
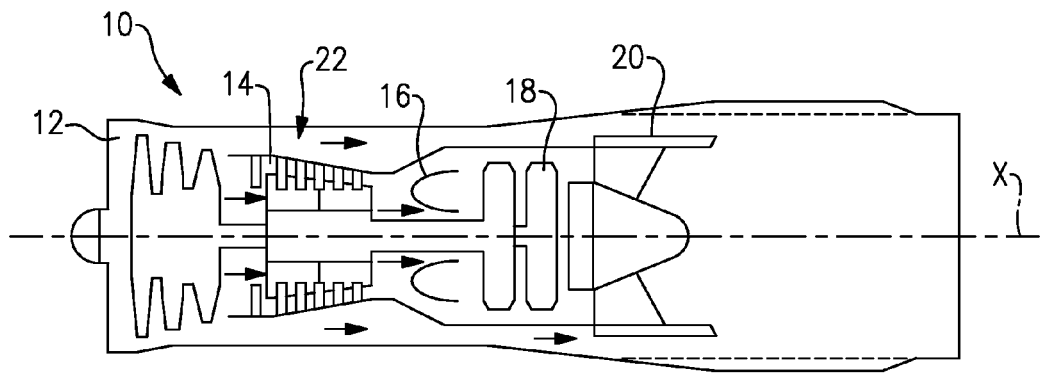

| Patent Number | | Date | Inventor |
|---|---|---|---|
| 4,050,133 | A | 9/1977 | Cretella et al. |
| 4,054,939 | A | 10/1977 | Ammon |
| 4,095,003 | A | 6/1978 | Weatherly et al. |
| 4,127,935 | A | 12/1978 | Ammon |
| 4,175,557 | A | 11/1979 | Hung |
| 4,216,576 | A | 8/1980 | Ammon et al. |
| 4,248,940 | A | 2/1981 | Goward et al. |
| 4,251,599 | A | 2/1981 | McCormick |
| 4,321,311 | A | 3/1982 | Strangman |
| 4,338,360 | A | 7/1982 | Cavanagh et al. |
| 4,402,992 | A | 9/1983 | Liebert |
| 4,407,712 | A | 10/1983 | Henshaw et al. |
| 4,661,099 | A | 4/1987 | von Bittera et al. |
| 4,684,538 | A | 8/1987 | Klemarczyk |
| 4,684,557 | A | 8/1987 | Pennace et al. |
| 4,690,683 | A | 9/1987 | Chien et al. |
| 4,838,253 | A | 6/1989 | Brassington et al. |
| 4,865,881 | A | 9/1989 | Sessa et al. |
| 5,032,430 | A | 7/1991 | Abe et al. |
| 5,110,435 | A | 5/1992 | Haberland |
| 5,262,245 | A | 11/1993 | Ulion et al. |
| 5,322,729 | A | 6/1994 | Heeter et al. |
| 5,456,940 | A | 10/1995 | Funderburk |
| 5,635,201 | A | 6/1997 | Fabo |
| 5,667,663 | A | 9/1997 | Rickerby et al. |
| 6,004,620 | A | 12/1999 | Camm |
| 6,365,013 | B1 * | 4/2002 | Beele ........................ 204/192.16 |
| 6,408,610 | B1 | 6/2002 | Caldwell et al. |
| 7,488,864 | B2 | 2/2009 | Sigurjonsson et al. |
| 2001/0001680 | A1 | 5/2001 | Farmer et al. |
| 2003/0026952 | A1 * | 2/2003 | Fried et al. ..................... 428/169 |

FOREIGN PATENT DOCUMENTS

| | | |
|---|---|---|
| EP | 0713957 | 5/1996 |
| EP | 0761386 | 3/1997 |
| EP | 0916445 | 5/1999 |
| EP | 1029103 | 8/2000 |
| EP | 1 275 749 A1 * | 1/2003 |
| EP | 1275749 | 1/2003 |
| EP | 1761386 | 3/2007 |
| GB | 845985 | 8/1960 |
| GB | 1440894 | 6/1976 |
| JP | 1184987 | 7/1989 |
| JP | 8-263148 A | 10/1996 |
| JP | 8263148 | 10/1996 |
| JP | 11084987 | 3/1999 |

* cited by examiner

COATING A PERFORATED SURFACE

BACKGROUND

This disclosure relates generally to applying a coating and, more particularly, to applying a coating to a perforated surface.

As known, gas turbine engines, and other turbomachines, include multiple sections, such as a fan section, a compressor section, a combustor section, a turbine section, and an exhaust section. Air moves into the engine through the fan section. Airfoil arrays in the compressor section rotate to compress the air, which is then mixed with fuel and combusted in the combustor section. The products of combustion are expanded to rotatably drive airfoil arrays in the turbine section. Rotating the airfoil arrays in the turbine section drives rotation of the fan and compressor sections. The hot gas is then exhausted through the exhaust section.

Some turbomachines include perforated, cylindrical liners. An augmentor liner within the exhaust section is one type of perforated, cylindrical liner. The augmentor liner establishes a passage between an inner cylinder and an outer cylinder. Cooling air, obtained from the compressor or fan, flows through the passage and through perforations within the inner cylinder. The air moving through the passage and through the cylinders facilitates removing thermal energy from this area of the gas turbine engine.

During assembly of the augmentor liner, the surfaces of the inner cylinder that will be exposed to the hot air are typically coated with a thermal barrier coating. The inner cylinder is then laser drilled to create perforations. If the thermal barrier coating extends into the perforations, the thermal barrier coating can block air movement through the perforations.

SUMMARY

An example method of coating a surface includes rotating a sprayer about an axis and directing spray away from the axis using the sprayer. The method coats a surface with the spray. The method moves a fluid through apertures established in the surface to limit movement of spray into apertures. The apertures are configured to direct the fluid toward the axis.

Another example method of coating an inner surface of an annular component includes inserting a sprayer within a bore established by an annular component and coating an inwardly directed surface of the annular component using a spray from the sprayer. The method moves a fluid through perforations established in the inwardly directed surface during the spraying.

An example component having a thermal barrier coating includes an annular component including an inwardly facing surface establishes perforations. A coating is secured to at least a portion of the inwardly facing surface. The inwardly facing surface is configured to direct a fluid through perforations to limit movement of the coating into perforations when spraying the coating against the inwardly facing surface.

These and other features of the disclosed examples can be best understood from the following specification and drawings, the following of which is a brief description.

BRIEF DESCRIPTION OF THE FIGURES

FIG. 1 shows an example gas turbine engine.

FIG. 2 shows a perspective view of a radially inner cylinder of an augmentor liner in the FIG. 1 engine.

FIG. 3 shows a schematic end view of the augmentor liner of the FIG. 1 engine.

FIG. 4 shows a close-up view of a portion of the FIG. 3 augmentor liner.

FIG. 5 shows a top view of another example perforation that can be established within the FIG. 3 augmentor liner.

FIG. 6 shows a top view of yet another example perforation that can be established within the FIG. 3 augmentor liner.

FIG. 7 shows a section view at line 7-7 in FIG. 6.

FIG. 8 shows an example of negative flow through perforations in the FIG. 3 augmentor liner.

FIG. 9 shows a close-up view of a portion of the FIG. 3 augmentor liner receiving an angled nozzle.

FIG. 10 shows a top view of an example perforation surrounded by a coating applied with the FIG. 9 nozzle.

DETAILED DESCRIPTION

Referring to FIG. 1, an example gas turbine engine 10 includes (in serial flow communication) a fan section 12, a compressor section 14, a combustor section 16, a turbine section 18, and an exhaust section 20. The gas turbine engine 10 is circumferentially disposed about an engine axis X. The gas turbine engine 10 is an example type of turbomachine.

During operation, air is pulled into the gas turbine engine 10 by the fan section 12. Some of the air is pressurized by the compressor section 14, mixed with fuel, and burned in the combustor section 16. The turbine section 18 extracts energy from the hot combustion gases flowing from the combustor section 16.

Some of the air pulled into the gas turbine engine 10 by the fan travels along a bypass path 22 rather than entering the compressor section 14. Air flowing along the bypass path 22 follows a path generally parallel to the axis X of the gas turbine engine 10.

In the two-spool engine design shown, a portion of the turbine section 18 utilizes the extracted energy from the hot combustion gases to power a portion of the compressor section 14 through a high speed shaft. Another portion of the turbine section 18 utilizes the extracted energy from the hot combustion gases to power another portion of the compressor section 14 and the fan section 12 through a low speed shaft. The examples described in this disclosure are not limited to the two spool architecture described, however, and may be used in other architectures, such as the single spool axial design, a three spool axial design, and still other architectures. That is, there are various types of gas turbine engines, and other turbomachines, that can benefit from the examples disclosed herein.

Referring now to FIGS. 2-4 with continued reference to FIG. 1, the example exhaust section 20 includes an augmentor liner 23 having a radially inner cylinder 24 and a radially outer cylinder 26. The radially inner cylinder 24 and the radially outer cylinder 26 are made of an austenitic nickel-chromium-based superalloys or Inconel™ in this example.

A passage 28 is established between the radially inner cylinder 24 and the radially outer cylinder 26. At least some of the air flowing through the bypass path 22 flows through the passage 28.

The inner cylinder 24 establishes a plurality of perforations 30 or apertures. The example perforations 30 are laser drilled. In another example, the perforations 30 are formed with rotating drill bits. Only a few perforations 30 are shown for clarity. The inner cylinder 24 typically includes an order of magnitude of 100,000 individual perforations 30.

Air moving through the passage 28 flows through the perforations 30 toward the axis X of the engine. The air facilitates removing thermal energy from this area of the augmentor liner 23 when the augmentor liner 23 is installed within the engine 10.

The inner cylinder 24 and the outer cylinder 26 are annular or ring shaped. The passage 28 established between the inner cylinder 24 and the outer cylinder 26 is also annular. The perforations 30 may be formed prior to, or after, shaping the inner cylinder 24 into a cylinder.

The inner cylinder 24 establishes a bore 38 and includes a surface 32. The surface 32 is concave and faces inwardly toward an axis $X_1$. Notably, the axis $X_1$ of the augmentor liner 23 is coaxial with the axis X of the engine 10 when the augmentor liner 23 is installed within the engine 10.

As can be appreciated, the surface 32 is exposed to more thermal energy than other areas of the augmentor liner 23. The surface 32 is coated with a thermal barrier coating 34 to protect the surface 32, and other portions of the augmentor liner 23, from thermal energy.

In this example, a sprayer 36 is used to apply the thermal barrier coating 34 to the surface 32. The coating 34 is a ceramic based coating that is plasma sprayed against the surface 32. The coating 34 is about 0.005 inches (0.127 millimeters) after curing, for example. Other examples include much thicker coatings.

The sprayer 36 is inserted within the bore 38 when spraying the coating 34. The sprayer 36 is rotated about the axis $X_1$ while spraying the thermal barrier coating from a nozzle 44. The spray from the sprayer 36 is directed away from the axis X1 toward the surface 32. The spray includes the coating 34, which adheres to the surface 32 to coat the surface 32.

Figure 5:
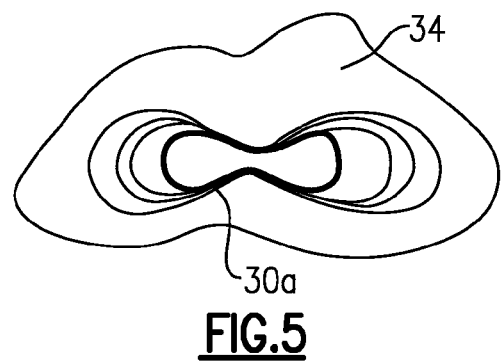
Figure 6:
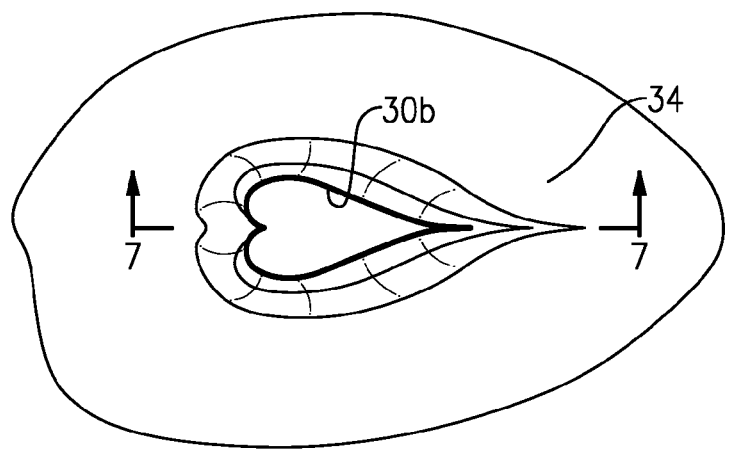
Figure 7:
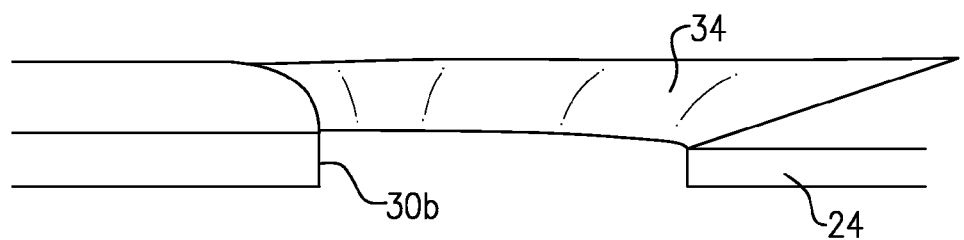

As the sprayer 36 applies the thermal barrier coating, a flow of air 40 (or another type of fluid) is directed through the perforations 30 established in the inner cylinder 24. The perforations 30 are shaped to promote directed flow coating buildup in one example. For example, a perforation 30a (FIG. 5) has an hour-glass shape. Another perforation 30b (FIGS. 6-7) is a heart shaped. Interaction between the thermal barrier coating 34 and the perforation 30a and 30b as the thermal barrier coating 34 is applied cause the contours of the thermal barrier coating 34 around perforations 30a and 30b to vary. A person having skill in this art and the benefit of this disclosure would be able to vary the shape of the perforations 30a and 30b to achieve the desired contours.

The flow of air 40 blocks the thermal barrier coating 34 from entering the perforations 30 as the coating 34 is sprayed and cured. The air 40 is pressurized to 12 psi (0.827 bar) for example. The air 40 is directed through the perforations 30 after applying the thermal barrier coating 34 and before the thermal barrier coating 34 has cured.

Figure 8:
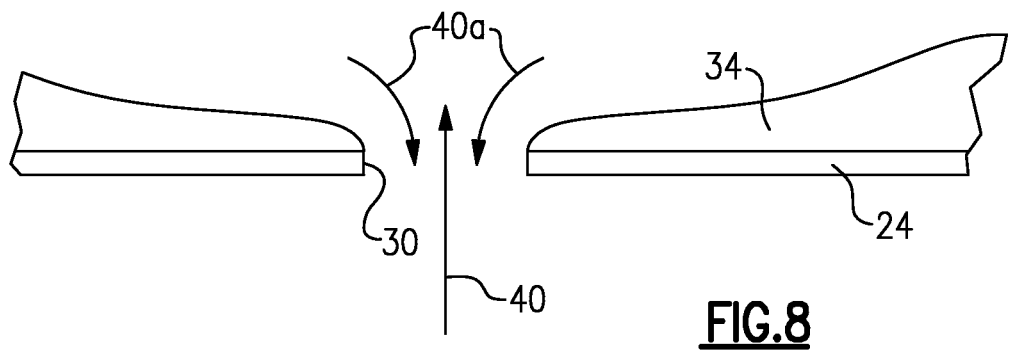

In some examples, the air 40 is heated to help prevent adherence. The air 40 could also be cooled. The air 40 also may be cycled with positive and negative flow to create optimal shape of the coating surrounding the perforations 30. An example of negative flow is shown by the flow of air 40a (FIG. 8). The negative flow of air 40a may be utilized to form the thermal barrier coating 34 around the aperture 30 into a desired shape.

In some examples, air is directed radially outboard, rather than radially inboard, through the perforations 30. The negative flow of air 40a is one example of radially outboard directed air. In some of these examples, the air 40a is pressurized on the nozzle side of the inner cylinder 24 to pull and form the thermal barrier coating 34 around the perforations 30. In such examples, the air 40 may result from a periodic controlled internal explosions, such as a shock pulses, that clear the thermal barrier coating 34 from the perforations 30.

In some examples, the thermal barrier coating 34 may have partially cured and covered the perforation 30, and the shock pulse breaks apart the portion covering the perforation 30. The air 40 or 40a is pulsed in some examples to fracture thin coating buildup over perforations 30.

The air 40 may include elements that chemically combine locally with the thermal barrier coating 34. The chemical combination helps prevent the thermal barrier coating 34 from adhering near the perforations 40.

Figure 2:
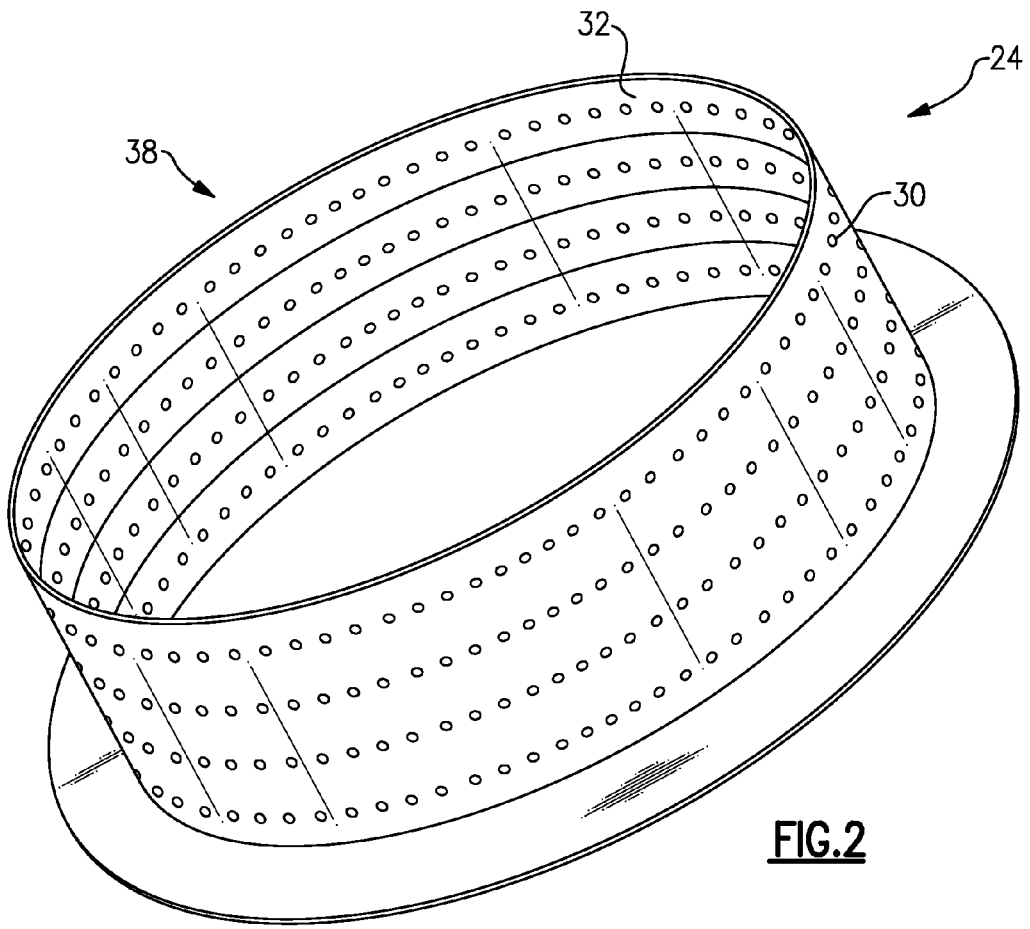
Figure 3:
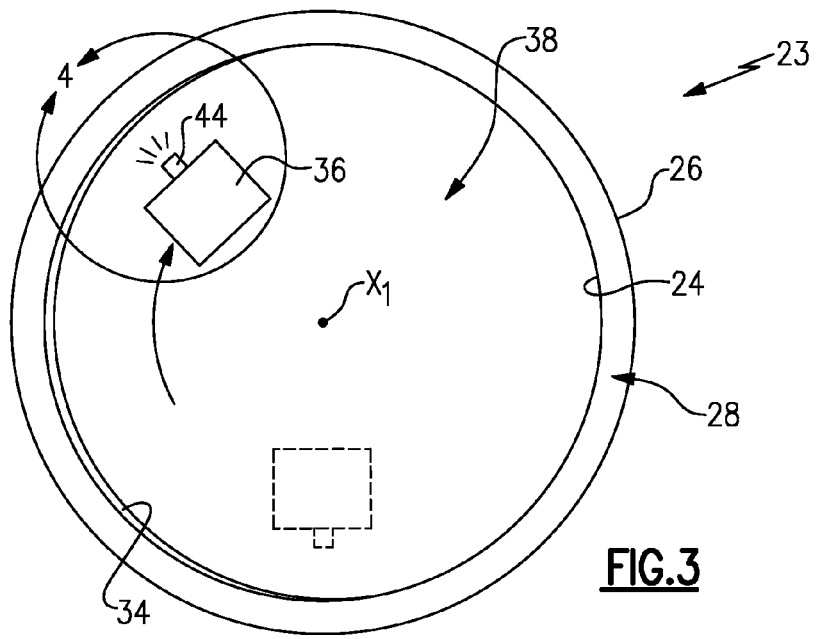
Figure 4:
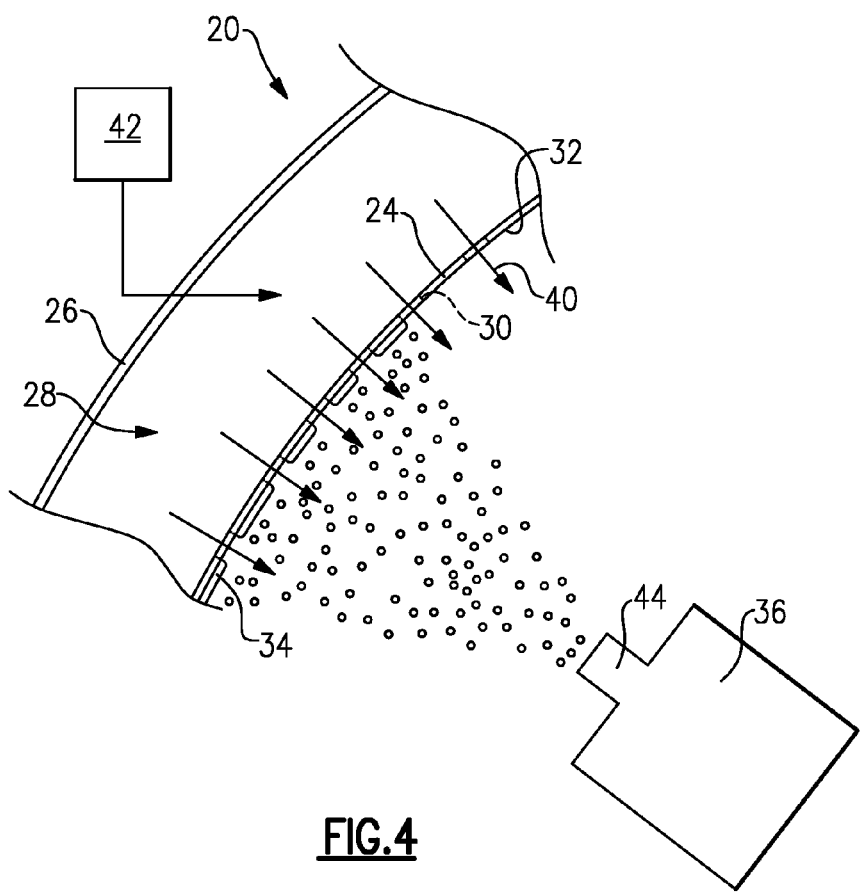

Referring again to FIGS. 2-3, in this example, the perforations 30 are radially aligned such that the perforations 30 direct the air radially toward the engine axis X. Other examples may utilize perforations configured to direct the air in other directions relative to the axis X.

In this example, the sprayer 36 applies the spray to the inner surface 32 prior to installing the augmentor liner 23 within the engine 10. Accordingly, an air supply 42 is used to supply air that is moved through the passage 28 during the spraying. The air supply 42 communicates air through the passage 28, which is the same path that air will travel from the bypass path 22 through the perforations 30 when the augmentor liner 23 is installed within the engine 10.

An example method of thermally protecting the augmentor liner 23 includes spraying the coating 34 against the surface 32 while rotating the sprayer about the axis X and while communicating the flow of air 40 through the perforations 30.

In one example, the augmentor liner 23 has been used within the engine 10 and already includes a used coating (not shown). In such an example, the used coating may be removed, by a chemical process for example, prior to applying the coating 34. The example method thus facilitates recoating used augmentor liners and other components.

Although described as coating the augmentor liner 23, the method could be applied to many other components, such as turbine blades, burner cans, and exhaust cases, for example.

Figure 9:
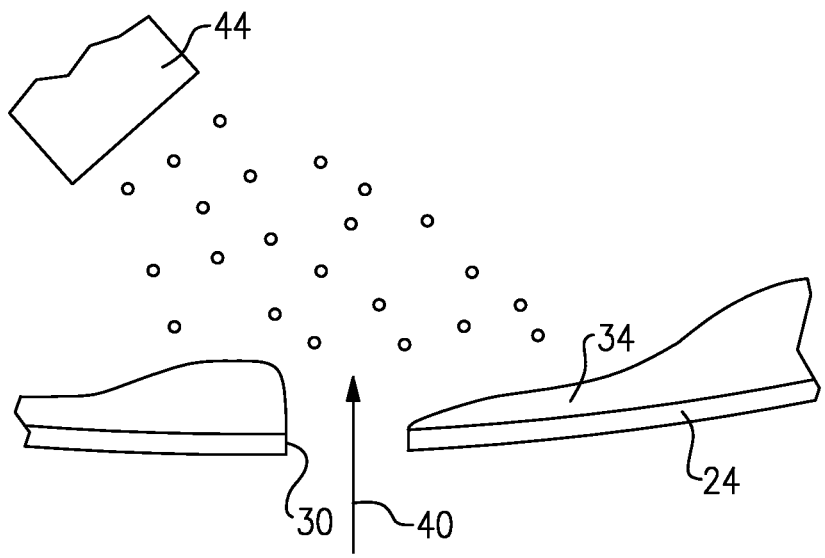
Figure 10:
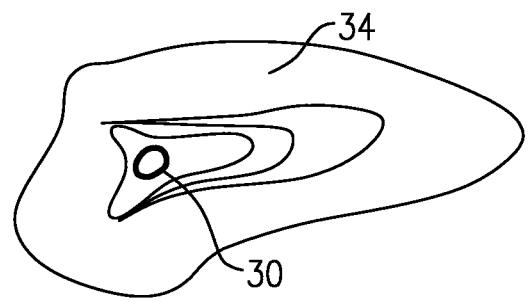

Referring to FIGS. 9 and 10, in some examples, the nozzle 44 is angled axially during the spraying, which results in shaped application of coating around perforations 30 (teardrops or chevrons as shown in FIG. 10, etc.) Further, in some examples, the nozzle 44 is angled off-centerline during the spraying, resulting in the profile or the coating having a circumferential feature, which creates a swirl or opposes a swirl in the engine 10.

Features of the disclosed examples include applying a sprayed coating to a component by rotating a sprayer relative to the concave surface while moving air through perforations in the concave surface to prevent the spray from blocking the perforations. Another feature of the disclosed example is providing the ability to recoat a used component with a thermal barrier coating.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method of coating a surface comprising:
   rotating a sprayer about an axis;
   directing spray away from the axis using the sprayer;
   coating a surface with the spray; and
   moving a fluid through a plurality of apertures established in the surface to block at least some movement of spray into the plurality of apertures, the plurality of apertures configured to direct the fluid toward the axis.

2. The method of claim 1, wherein the surface is a radially inner surface of an augmentor liner.

3. The method of claim 1, including directing the fluid though an annular passage established between a radially inner cylinder and a radially outer cylinder before moving the fluid through the plurality of apertures.

4. The method of claim 1, wherein the surface comprises a concave surface.

5. The method of claim 1, wherein the directing is during the rotating.

6. The method of claim 1, wherein the surface comprises an annular surface.

7. The method of claim 1, wherein the plurality of apertures are circumferentially distributed about the sprayer.

8. The method of claim 1, wherein the plurality of apertures extend radially away from the axis.

9. The method of claim 1, including removing a used coating from the surface prior to the coating.

10. A method of coating an inner surface of an annular component comprising:
    inserting a sprayer within a bore established by an annular component;
    coating an inwardly directed surface of the annular component using a spray from the sprayer; and
    moving a fluid through a plurality of perforations formed in the inwardly directed surface during the spraying.

11. The method of claim 10, wherein the annular component is an augmentor liner.

12. The method of claim 10, including directing the fluid though an annular passage formed between a radially inner wall and a radially outer wall before moving the fluid through the plurality of perforations.

13. The method of claim 10, including rotating the annular component relative to the sprayer during the coating.

14. The method of claim 10, wherein the plurality of perforations are circumferentially distributed about the sprayer.

15. The method of claim 10, wherein a distance between the sprayer and the inwardly directed surface is maintained during the spraying.

16. The method of claim 10, including removing a used coating from the inwardly directed surface prior to coating the inwardly directed surface.

17. The method of claim 10, wherein the coating is a thermal barrier coating.

\* \* \* \* \*